UNITED STATES PATENT OFFICE.

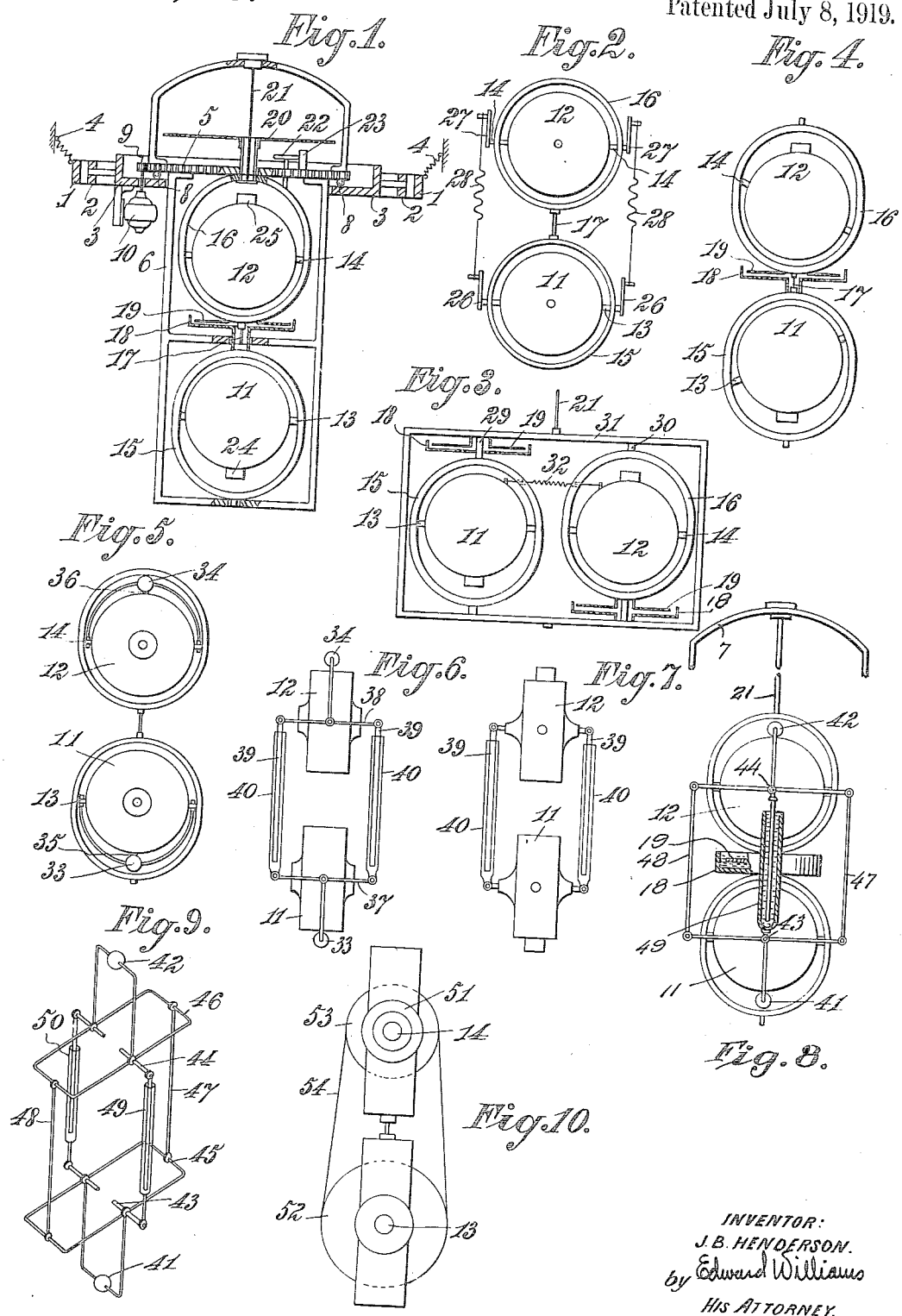

JAMES BLACKLOCK HENDERSON, OF LEE, ENGLAND.

GYRO-COMPASS.

1,309,409. Specification of Letters Patent. Patented July 8, 1919.

Application filed January 22, 1917. Serial No. 143,682.

*To all whom it may concern:*

Be it known that I, JAMES BLACKLOCK HENDERSON, a subject of the King of Great Britain, residing at 2 Cambridge road, Lee, Greenwich, in the county of Kent, England, have invented certain new and useful Improvements in Gyro-Compasses, of which the following is a specification.

My invention relates to improvements in gyro-compasses and has for its object to reduce the deviation of the compass due to oscillatory motion of the ship when on an intercardinal course.

In my application Serial No. 130,407 I have described a form of gyro-compass in which two equal gyros are employed, each gyro being mounted on a horizontal trunnion axis. One gyro is in stable equilibrium on its horizontal trunnion axis and the other is in unstable equilibrium on that axis.

My present invention consists in imparting the stability or instability to the gyrocases by means of a system which is practically in neutral equilibrium with regard to alternating stresses produced by pendular oscillations of the compass as a whole, so that the inertia stresses will not be taken by the gyroscopes.

In carrying this invention into effect I may employ pendulums upright or inverted the pendulums being connected together by links so that they form a system in neutral equilibrium. The pendulums may be pivoted on the trunnion axes, or on other suitable supports. I arrange one or more of the links connecting the pendulums so that it is approximately rigid for alternating stresses but yields to continuous stress, as for example by constructing it in two parts movable relatively to each other against the resistance of a viscous fluid. The alternating stresses introduced by the rolling of the ship are thus taken by the links connecting the pendulums and are not transmitted to the gyroscope rotors.

The gyroscope cases may themselves be considered as the pendulums and may be connected by means of a viscous link or links.

In one arrangement of the two gyroscopes which I have described in my application, Serial No. 130,407, the respective stability and instability are produced by a spring or springs by fitting a crank to each trunnion axis, the two cranks being in the same phase and normally in the plane through the two trunnion axes the crank pins being connected by a spring. According to my present invention I connect the same crank, or preferably two other cranks placed at right angles to the spring connected cranks, by means of a connecting rod which has a viscous element in its length. This connecting rod may consists of two tubes sliding one inside the other, the space between them being filled with thick oil or other viscous material. The spring and connecting rods are preferably duplicated on the other end of the trunnion axes to maintain symmetry and gravitational balance.

The pendulums which I employ may in some cases be made of long period either by increasing their moment of inertia or by means of gyroscopes.

In the accompanying drawings illustrating my invention,

Figure 1 is a diagrammatic view of the general arrangement of one form of compass, Fig. 2 is a view of the sensitive element of the compass fitted with a device for providing gravity control, Figs. 3 and 4 are views showing different methods of applying damping couples to the compass, Figs. 5 to 9 show devices for balancing the inertia effects of the gravity control system, Fig. 10 shows a device for preventing the deviation due to friction of the gyroscopes on their trunnions.

Every gyro compass consists of a "sensitive element" and a "following element" the sensitive element being suspended from or supported on the following element either by means of a float in a bath of mercury or by means of a torsion wire or by other suitable connection. When the sensitive element moves in azimuth electric contacts are made which actuate a motor and cause the following element to keep approximately in phase with the azimuthal motion of the sensitive element. The following element is carried in an ordinary compass binnacle on the usual arrangement of gimbal rings and spring supports common in compass binnacles.

In Fig. 1 the ordinary gimbal rings of the binnacle are numbered 1, 2 and 3, No. 1 being supported from the binnacle by the springs 4. The following element consists of a plate 5, a frame 6 and a bridge piece 7 all rigidly fastened together. The plate 5 is supported on a ball bearing 8 on the innermost gimbal ring 3. The plate 5 has teeth cut in its periphery which gear with the spur pinion 9 on the spindle of the small electric motor 10 which is supported by the gimbal ring 3. Alternatively the motor 10 may be mounted on the frame 6 and the pinion 9 may gear with teeth cut in the edge of the ring 3.

The sensitive element consists of two gyroscopes in their cases 11 and 12 which are supported respectively on the horizontal trunnion axes 13 and 14 in the vertical rings 15 and 16. These rings are connected by a central elastic torsional element 17 and also according to the invention by a viscous damper consisting of two plates 18 and 19 separated by a small space which is filled with viscous fluid. The upper ring 16 carries the compass card 20. The whole sensitive element consisting of the two gyros 11 and 12 the two rings 15 and 16 and the compass card 20 is shown suspended centrally from the bridge piece 7 of the following element by the wire suspension 21, but it is to be understood that it might equally well be suspended on a float or by any of the other methods usually employed. The sensitive element is kept central on the following element by suitable bearings as shown in the figure. The motor of the following mechanism is actuated by electric contacts consisting of the roller 22 attached to the ring 16 and a two part commutator carried by the small pillar 23 attached to the plate 5 of the following element.

The gyro case 11 is put in stable equilibrium on the trunnions 13 by means of the weight 24 and the gyro case 12 is put in unstable equilibrium on its trunnion axis 14 by means of the weight 25. The rotors of the two gyros are arranged to rotate in opposite directions the stable gyro-rotor revolving in the same sense as the earth revolves when the compass is in operation. With either gyro running, this sensitive element would oscillate about the meridian with a definite period. I arrange the period of oscillation when the stable gyro is running to be less than when the unstable gyro is running so that when both are running their inter-action tends to accelerate the precession of the unstable gyro and to retard the precession of the stable one and thus tends to damp out the oscillation about the meridian. The adjustment of the periods is arranged by designing the rotors with different moments of inertia or different speeds or by different gravity controls.

This arrangement of gyros has in addition to the common oscillation of the two gyros about the meridian also a relative oscillation of the two gyros of much shorter period and in order to damp this oscillation I introduce the viscous damper 18—19 between the two rings 15 and 16.

Instead of producing the stability and instability of the two gyro cases by means of weights I may produce these by means of springs as is shown in Fig. 2, in which only part of the sensitive element is shown and the reference numbers of the gyro cases and vertical rings agree with the numbers in Fig. 1. The trunnions 13 and 14 are fitted with two sets of cranks 26 and 27 at right angles to the rotor axes as shown and all four cranks are vertical and upward when the rotor axes are in their normal positions. The cranks 26 and 27 are connected by springs 28, and these springs produce the required stability and instability.

In order to improve the damping of the long period oscillation of the compass about the meridian I may introduce a torque with a vertical axis between the two gyros proportional to the tilt of the rotor axes to the horizontal plane. One arrangement for effecting this torque is shown in Fig. 3 and another in Fig. 4 in both of which figures only the sensitive element is shown.

In Fig. 3, the two vertical rings 15 and 16 with their gyro cases 11 and 12 are mounted side by side on vertical trunnions 29 and 30 on a frame 31 which is suspended by the wire 21. A horizontal spring 32 connects two points on the central planes of the two rotor cases as shown, the spring passing through clearance holes in the rings 15 and 16. A damper is fitted between each of the rings 15 and 16 and the frame 31.

When either gyro tilts about its horizontal trunnion axis it is evident that the tension of the spring 32 has a moment about the trunnion axis 29 or 30 and since action and reaction are equal and opposite the couple on the one gyro must be equal and opposite to that on the other. In this respect it is unnecessary to have both gyros mounted on vertical trunnions so one of them might have its horizontal trunnions pivoted on the frame 31 directly.

In Fig. 4 the same result is achieved by inclining the trunnion axes 13 and 14 in the rings 15 and 16 in opposite directions, the axes being farther apart on the east side of the compass than they are on the west side. It is evident that if both gyro rotor axes tilt upward a torque is applied to the torsional connection 17 between the two rings.

The arrangements in Figs. 1, 2, 3 and 4 are damped if there is no torque in the suspending wire 21 when they are fitted according to the invention with the torsional damper 18—19.

The great advantage of this two gyro sensitive element is that it enables the gravitational control system to be designed so that it is practically in neutral equilibrium as a whole so that the reciprocating stresses introduced by the rolling or pitching of the ship have no effect on the compass. In order to achieve this balance to the fullest extent I may according to the invention arrange the gravitational control by means of pendulums in one or other of the methods shown in Figs. 5 and 6, Fig. 7 and Figs. 8 and 9.

Figs. 5 and 6 show two elevations of the sensitive element. The respective stability and instability are imparted to the gyro cases 11 and 12 about the horizontal trunnion axes 13 and 14 by means of the pendulums 33 and 34 which are pivoted on the trunnion axes 13 and 14 and are connected to the rotor cases by pins 35 and 36 engaging in holes in the pendulum with a very slight play in the holes. Each pendulum is fitted with a rigid T-head 37 and 38 as shown in Fig. 6, and the ends of the horizontal bars of the two T's are interconnected by viscous elements consisting of a rod 39 pivotally connected to 38, and sliding in a tube 40 pivotally connected to the head 37. The space between the rod 39 and the tube 40 is filled with viscous fluid. The viscosity of the fluid causes these connecting elements to play the part of rigid connections between the two pendulums for rapidly alternating stresses such as those introduced by wave motion but does not interfere with the slow precessional motion of the compass as a whole.

It is evident that if there were no play on the pins 35 and 36 the gyro cases might themselves be considered as the pendulums and the arrangement reduces to that shown in Fig. 7, in which the viscous elements connect the two ends of the central axes of the casings. In Figs. 8 and 9 this balancing of the gravitational system is combined with an arrangement for preventing the pendulum from deviating from the true vertical when the compass as a whole swings due to rolling of the ship.

The pendulums 41 and 42 are supported on the rotor cases 11 and 12 on axes 43 and 44 which are shown coaxial with the rotor axis but not necessarily so. They may be placed both to the east or west of the rotor axis or one may be to the east and the other to the west, but the axes are parallel to the rotor axes. To each pendulum is attached rigidly a rectangular frame of wire 45, 46 as shown in Fig. 9, and these two frames are connected by the connecting rods 47 and 48 and by the viscous elements 49 and 50. The pendulums thus form in the east-west vertical plane a system in neutral equilibrium so that as the compass swings in the E-W direction due to rolling of the ship there is no tendency for the pendulum to leave the true vertical except the friction on the pivots. To prevent the pendulum departing far from the true vertical due to friction forces I may make the pendulum 41 slightly heavier than the pendulum 42 or I may attach pendulum 41 to the center of the rotor casing 11 by a very slight spring connection. I also damp any oscillations of these pendulums by fluid in the pendulum bobs or by other suitable internal damping system.

Since friction on the horizontal trunnion axis of the stable gyro tends to damp its oscillation but friction on the similar axis of the unstable gyro tends to increase its oscillation, I may, if necessary, reverse the frictional couples on the trunnions of the unstable gyro at the expense of increased friction on the stable gyro. For example, as shown in Fig. 10, I may provide the trunnion 14 of the unstable gyro with a loose sleeve bearing 51. The trunnion of the stable gyro 13 has a pulley 52 fixed to it and the sleeve 51 has a smaller pulley 53 fixed to it and these two pulleys are connected by a belt or cord 54. Thus when the two gyros tilt together the frictional couple on the trunnion 14 is opposite to that on the trunnion 13.

What I claim as new and desire to secure by Letters Patent of the United States, is:—

1. A gyro-compass comprising in combination two gyroscopes, one in stable and one in unstable equilibrium, means preventing the inertia stresses of the pendulum being imparted to the gyroscopes and a torsional connection between the gyroscopes whereby their mutual reactions damp the oscillations of the compass and prevent deviation due to lateral movement.

2. A gyro-compass comprising in combination two gyroscopes, one in stable and one in unstable equilibrium, and viscous damping means acting about the vertical axes of the gyroscopes.

3. A gyro-compass comprising in combination two gyroscopes, one in stable and one in unstable equilibrium, and viscous damping means action about the horizontal axes of the gyroscopes.

4. A gyro-compass comprising in combination two gyroscopes, one in stable and one in unstable equilibrium, and viscous damping means acting about both the vertical and horizontal axes of the gyroscopes.

5. A gyro-compass comprising in combination a frame, a suspension therefor, two gyroscopes mounted in the frame, one of which is in stable equilibrium and the other in unstable equilibrium, the direction of rotation of the unstable gyroscope being opposite to that of the other and viscous damping means acting on an axis of the gyroscopes whereby their mutual reactions damp the oscillations of the compass and prevent deviation due to periodic lateral movement.

6. A gyro-compass comprising in combination a frame, a suspension therefor, two connected gyroscopes mounted in the frame, one of the gyroscopes being in stable equilibrium and the other in unstable equilibrium, a pendulum pivoted on the rotor axis of the stable gyroscope, an inverted pendulum pivoted on the rotor axis of the unstable gyroscope and means connecting the pendulums whereby they can move relative to each other against the resistance of a viscous fluid.

7. A gyro-compass comprising in combination a frame, a suspension therefor, two oppositely rotating gyroscopes mounted in the frame, one of which is in stable equilibrium and one in unstable equilibrium, a pendulum pivoted on the rotor axis of the stable gyroscope, an inverted pendulum pivoted on the rotor axis of the unstable gyroscope, a rectangular frame attached to each pendulum, rods connecting the frames and viscous elements consisting of rods sliding in oil filled tubes located intermediate said rectangular frames.

In witness whereof, I have hereunto set my hand this 4th day of January 1917.

JAMES BLACKLOCK HENDERSON.

Witnesses:
HAROLD BARON,
PHYLLIS M. IVORY.